Patented Aug. 29, 1944

2,357,069

UNITED STATES PATENT OFFICE 2,357,069

IRON FORTIFICATION OF FLOUR

Rufus A. Barackman, Chicago Heights, Ill., assignor to Victor Chemical Works, a corporation of Illinois No Drawing. Application April 7, 1941, Serial No. 387,363

12 Claims. (Cl. 99—93)

This invention relates to the iron fortification of flour and other fat containing foods.

It has been realized heretofore that flour is deficient in iron and there have been various suggestions, compounds and processes for the iron fortification of flour. In the past, however, all of the efforts to fortify flour with iron have been unsatisfactory because iron, like certain other metals, catalyzes the decomposition of the fat in the flour and causes the prompt development of rancidity therein. It has thus been impossible in the past to supply flour in which iron compounds are present in desirable quantity. This is particularly true of self rising flour compositions in which shortening is included along with the flour.

I have now discovered that iron may be satisfactorily introduced into fat containing substances such as flour without promoting rancidity thereof, provided it is added in a form in which the iron is firmly held in complex combination with dehydrated phosphoric acid radicals, and in which the pH of the composition is at least approximately 7.0.

The preferred compositions are salts of the alkali metals, iron, and phosphoric acid more dehydrated than orthophosphoric acid. The alkali metals as here specified include sodium, potassium and ammonium. The phosphoric acids include the pyro, poly and metaphosphoric acids.

The complex iron containing phosphate compounds are generally prepared by reacting a soluble ferric salt with a soluble salt of the pyro, poly, or metaphosphoric acid, filtering off the precipitated ferric phosphate compound and reacting this precipitate while still wet with at least one molecular equivalent of the alkali metal or ammonium salt of the corresponding phosphoric acid. For example, a sodium ferric pyrophosphate may be prepared by precipitating ferric pyrophosphate from an aqueous mixture of stoichiometric proportions of ferric sulfate and tetrasodium pyrophosphate. The precipitated ferric pyrophosphate while still wet is rapidly and thoroughly mixed with from one to five molecular equivalents of a strong solution of tetrasodium pyrophosphate. The reaction which takes place causes the mass to set up. The solid mass is then dried at a temperature of from 100 to 150° C. to form products having from 6 to 20 mols of water depending on the ratio of the reactants employed.

Sodium ferric pyrophosphates were made in accordance with the above process having the following ratios of sodium to ferric pyrophosphates:

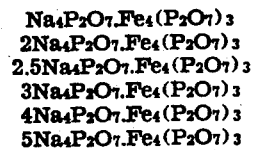

$Na_4P_2O_7.Fe_4(P_2O_7)_3$
$2Na_4P_2O_7.Fe_4(P_2O_7)_3$
$2.5Na_4P_2O_7.Fe_4(P_2O_7)_3$
$3Na_4P_2O_7.Fe_4(P_2O_7)_3$
$4Na_4P_2O_7.Fe_4(P_2O_7)_3$
$5Na_4P_2O_7.Fe_4(P_2O_7)_3$

The exact structural formulae for these complex salts is not known but the iron is apparently bound in a complex anion structure while the alkali metal apparently acts as the cation. These complex compositions are in general only slightly soluble in water. These compositions have been carefully tested when added to flour, wheat germ meal and vegetable oil and are found not to develop rancidity therein. For example the use of 0.05% of sodium ferric pyrophosphate in flour caused no rancidity to develop in the period of time required for the plain flour control to become rancid. If, however, the molecular ratio of sodium pyrophosphate to ferric pyrophosphate is allowed to become less than 1, and the pH falls markedly below 7.0, there is some development of rancidity. However, using a compound in which the ratio of sodium pyrophosphate to ferric pyrophosphate was more than 1, no rancidity developed even when 1.5% of iron was added.

Other tests were made on wheat germ meal at 37° C. using an amount of iron composition equivalent to 1.75% of the mixture (based on the Fe content). These tests showed conclusively that sodium ferric pyrophosphate, potassium ferric pyrophosphate, ammonium ferric pyrophosphate, sodium ferric metaphosphate, and sodium ferric tripolyphosphate did not cause development of rancidity, provided they were employed in compositions having a pH of at least approximately 7.0.

Other tests were made on other compounds using other fat containing materials with similar results. The complex iron dehydrated phosphoric compounds were added to flour in sufficient ratio to give the flour an iron content preferably of about 4 to 25 mg. per pound of flour. The amount of iron added should depend upon the original iron content of the flour, the added iron, however, being generally from 1 to 25 mg. per 100 grams of flour. For some purposes, however, an upper limit of 20 milligrams per 100 grams of flour is preferred. As explained, however, tests with as much as 1.5 grams of iron per 100 grams of flour have shown no tendency to become rancid within the period of time required for the unfortified flour to become rancid.

A typical analysis of a suitable anionic-iron composition made by reacting approximately two mols of sodium pyrophosphate with one mol of ferric pyrophosphate and drying at 150° C. was as follows:

|  | Per cent |
|---|---|
| $P_2O_5$ | 49.4 |
| $Fe_2O_3$ | 22.2 (15.5 Fe) |
| $Na_2O$ | 19.0 |
| Loss on ignition | 8.3 |

This material was milled to a degree of fineness such that 95% would pass through a 325 mesh screen and then mixed with from 5 to 20 times its weight of flour, wheat germ meal, etc. to form an intermediate mixture which subsequently may be mixed with flour to give a final flour composition containing the desired anionic iron content. The intermediate stage in the mixing is recommended in order to facilitate the distribution of the small amount of iron composition throughout the flour. For example, a 10% concentrate of the above specified composition when added to flour in an amount equal to 0.25% of the flour will give a final flour composition containing approximately 18 milligrams of iron per pound.

In another test one part of the above sodium ferric pyrophosphate composition was added to 99 parts of a commercial partially hydrogenated cottonseed oil and the mixture aged for several months without showing any effect on the promotion of rancidity.

The term "dehydrated phosphoric acid," as used in the claims hereof, means any phosphoric acid which is molecularly dehydrated beyond the orthophosphoric acid stage. The least dehydrated of such acids is the pyrophosphoric acid. Also included are the polyphosphates such as tripolyphosphoric acid and tetrapolyphosphoric acid, and the metaphosphate which is the most dehydrated of the group.

When tripolyphosphates are employed it is generally necessary to use a ratio of at least 2 mols of sodium to one mol of iron in order to produce a pH sufficiently high. A 2-to-1 ratio gives a pH of 6.98; and 2.5-to-1, a pH of 7.0.

In the case of a metaphosphate complex it is difficult to add sufficient alkali in the complex to make the material neutral. However, if an alkaline salt such as tetrasodium pyrophosphate is added to ferric metaphosphate and the materials dried together, the resulting pH may be raised sufficiently high to obtain satisfactory results.

In the case of the pyrophosphates, molecular ratios of 1-to-1 give satisfactory pH values.

It is preferred not to use compositions having a pH much above 8.

The pH determinations herein referred to are made by agitating 5 grams of finely divided material with 100 c. c. of water, permitting the mixture to settle for 3 or 4 minutes, and then measuring the pH of the supernatant liquid with a glass electrode.

As used herein, the term "fat" is meant to include solid or liquid fatty materials. No distinction is made between the terms "oil" and "fat."

The term "iron" as used in the claims refers to the ferric rather than to the ferrous salts.

The foregoing detailed description has been given for clearness of understanding only, and no unnecessary limitations should be understood therefrom.

What I claim as new, and desire to secure by Letters Patent, is:

1. A stable food product including a fat capable of becoming rancid, and a small significant proportion of a complex-bound iron-alkali metal salt of a molecularly dehydrated phosphoric acid having a pH of at least approximately 7.0.

2. A stable cereal product including a cereal and a small significant proportion of a complex-bound iron-alkali metal salt of a molecularly dehydrated phosphoric acid having a pH of at least approximately 7.0.

3. A product as set forth in claim 2, in which the cereal is flour.

4. A cereal composition including a flour and 1 to 25 mg. per lb. of flour of iron in the form of an alkali metal-iron complex of a molecularly dehydrated phosphoric acid, the complex having a pH of at least approximately 7.0.

5. A cereal composition including a flour and 1 to 20 mg. per lb. of flour of iron in the form of an alkali metal-iron complex of a molecularly dehydrated phosphoric acid, the complex having a pH of at least approximately 7.0.

6. A method of fortifying fat-containing food products with iron comprising admixing said food products with alkali metal-ferric salts of a molecularly dehydrated phosphoric acid having a pH of at least approximately 7.0.

7. A cereal composition including a fat-containing cereal and a small significant proportion of a complex alkali metal-iron pyrophosphate having a molecular ratio of alkali metal to iron sufficient to give the complex a pH value of at least approximately 7.0.

8. A cereal composition including a fat-containing cereal and a small significant proportion of a complex alkali-metal-iron tripolyphosphate having a molecular ratio of alkali metal to iron sufficient to give the complex a pH value of at least approximately 7.0.

9. A composition as set forth in claim 7, in which the mole ratio of alkali metal to iron is from 1 to 5.

10. A composition as set forth in claim 7, in which the mole ratio of alkali metal to iron is approximately 2.0 and in which the alkali metal is sodium.

11. A product as set forth in claim 7, in which the iron-containing complex is substantially insoluble in water.

12. A product as set forth in claim 7, in which the cereal is wheat flour.

RUFUS A. BARACKMAN.